US007224493B2

(12) United States Patent
Chelvayohan et al.

(10) Patent No.: US 7,224,493 B2
(45) Date of Patent: May 29, 2007

(54) IMAGING APPARATUS HAVING A MEDIA SENSOR

(75) Inventors: Mahesan Chelvayohan, Lexington, KY (US); Timothy Lorn Howard, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 879 days.

(21) Appl. No.: 10/318,299

(22) Filed: Dec. 12, 2002

(65) Prior Publication Data

US 2004/0114201 A1 Jun. 17, 2004

(51) Int. Cl.
*H04N 1/00* (2006.01)
*H04N 1/04* (2006.01)
*H04N 1/40* (2006.01)
*B65H 5/22* (2006.01)

(52) U.S. Cl. ...................... 358/405; 358/497; 358/448; 271/3.01

(58) Field of Classification Search ................ 358/405, 358/497, 448, 496; 271/3.01; 400/703
See application file for complete search history.

(56) References Cited

U.S. PATENT DOCUMENTS

| | | | | |
|---|---|---|---|---|
| 4,892,426 | A | 1/1990 | Steele | 400/708 |
| 4,970,606 | A | 11/1990 | Shima | 358/474 |
| 4,982,235 | A | 1/1991 | Fujino | 355/235 |
| 4,994,678 | A | 2/1991 | Sasaki | 250/560 |
| 5,325,213 | A | 6/1994 | Takahashi et al. | 358/474 |
| 5,508,520 | A | 4/1996 | Shoji et al. | 250/559.4 |
| 5,610,731 | A | 3/1997 | Itoh | 358/496 |
| 5,661,571 | A | 8/1997 | Ijuin et al. | 358/471 |
| 5,734,483 | A | 3/1998 | Itoh | 358/496 |
| 5,764,382 | A | 6/1998 | Shiraishi | 358/496 |
| 5,798,841 | A | 8/1998 | Takahashi | 358/296 |
| 5,805,308 | A | 9/1998 | Tanaka et al. | 358/486 |
| 5,878,319 | A | 3/1999 | Itoh | 399/367 |
| 5,900,951 | A | 5/1999 | Tsai | 358/497 |
| 5,907,413 | A | 5/1999 | Han | 358/497 |
| 5,999,277 | A | 12/1999 | Tsai | 358/498 |
| 6,005,685 | A | 12/1999 | Tsai | 358/497 |
| 6,147,339 | A | 11/2000 | Matsumoto | 250/208.1 |
| 6,152,443 | A | 11/2000 | Claramunt et al. | 271/258.05 |
| 6,246,492 | B1 | 6/2001 | Chang et al. | 358/497 |
| 6,424,435 | B1 | 7/2002 | Kao | 358/497 |
| 6,464,414 | B1 * | 10/2002 | Washnock | 400/56 |

* cited by examiner

*Primary Examiner*—Jerome Grant
*Assistant Examiner*—Houshang Safaipour
(74) *Attorney, Agent, or Firm*—Taylor & Aust, P.C.

(57) ABSTRACT

An imaging device has a print media path for transporting a print media sheet in a sheet feed direction. A mounting device is coupled to a frame. A media sensor has a body and at least one rotating member rotatably coupled to the body. The body is coupled to the mounting device. The mounting device is configured to facilitate movement of the media sensor in a direction toward the media path and to restrain movement of the media sensor in the sheet feed direction. The media sensor is positioned by the mounting device such that at least one rotating member rotates due to contact with a surface of the print media sheet as the print media sheet moves relative to the media sensor in the sheet feed direction along the print media path.

13 Claims, 3 Drawing Sheets

IMAGING APPARATUS HAVING A MEDIA SENSOR

BACKGROUND OF THE INVENTION

1. Field of the Invention

The present invention relates to an imaging apparatus, and, more particularly, to an imaging apparatus having a media sensor.

2. Description of the Related Art

Media sensors are used to detect the presence or absence of print media, and in some cases, are also used to determine the print media type. One form of a media sensor includes a single light source, such as a light emitting diode (LED), and a light detector, such as a phototransistor. Typically, the light detector is located on the same side of a print media as the light source. During operation, the LED directs light at a predefined angle onto a material surface of the print media, and the surface characteristics of the print media are examined in terms of the amount of light reflected from the surface that is received by the light detector. For example, the presence of the print media is detected based upon a predetermined amount of light reflected from the media to the light detector.

Some media sensors include a pair of light detectors, one of the light detectors being positioned to sense reflected diffuse light and a second detector positioned to sense reflected specular light. Such a sensor may be used, for example, to detect and discriminate between paper media and transparency media.

A media sensor that contacts directly a surface of a print media sheet is known in the art as a contact media sensor. Often, the contact media sensor is spring biased to be in contact with the media surface. Typically, such a contact media sensor includes a skid surface which slides along the surface of a print media sheet as the print media sheet advances in a sheet feed direction. The friction created by the contact of the skid surface of the contact media sensor and the surface of the print media sheet often permanently marks or scuffs the surface of the print media sheet.

What is needed in the art is an imaging apparatus configured to reduce or eliminate the marking or scuffing of a surface of a print media sheet resulting from contact between a media sensor and the surface of the print media sheet.

SUMMARY OF THE INVENTION

The present invention relates to an imaging apparatus configured to reduce or eliminate the marking or scuffing of a surface of a print media sheet resulting from contact between a media sensor and the surface of the print media sheet.

The invention, in one form thereof, is directed to an imaging device having a print media path for transporting a print media sheet in a sheet feed direction. The imaging device includes a frame. A mounting device is coupled to the frame. A media sensor has a body and at least one rotating member rotatably coupled to the body. The body is coupled to the mounting device. The mounting device is configured to facilitate movement of the media sensor in a direction toward the media path and to restrain movement of the media sensor in the sheet feed direction. The media sensor is positioned by the mounting device such that at least one rotating member rotates due to contact with a surface of the print media sheet as the print media sheet moves relative to the media sensor in the sheet feed direction along the print media path.

In another form thereof, the invention is directed to an imaging apparatus including a frame and a print media source coupled to the frame. The print media source includes a media support defining, in part, a print media path along which a print media sheet is transported in a sheet feed direction. A mounting device is coupled to the frame. A media sensor has a body and at least one rotating member rotatably coupled to the body. The body is coupled to the mounting device. The mounting device is configured to facilitate movement of the media sensor in a direction toward the media support and to restrain movement of the media sensor in the sheet feed direction. The media sensor is positioned by the mounting device such that at least one rotating member rotates due to contact with a surface of the print media sheet as the print media sheet moves relative to the media sensor in the sheet feed direction.

An advantage of the present invention is that the media surface that is contacted by the media sensor is less likely to be marked or scuffed as a result of such contact.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
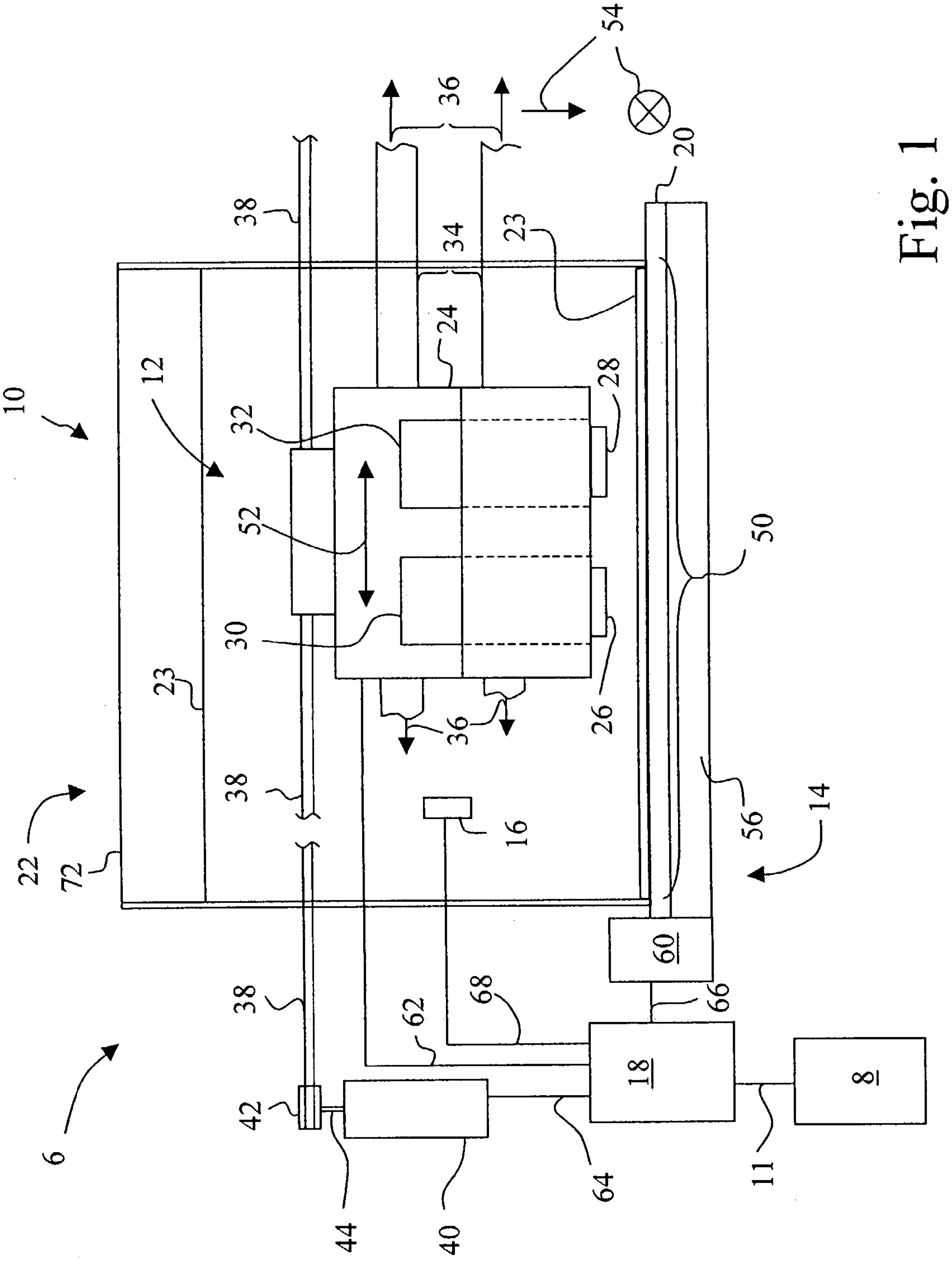
FIG. 1 is a diagrammatic representation of an imaging system including an imaging apparatus embodying the present invention.
Figure 2:
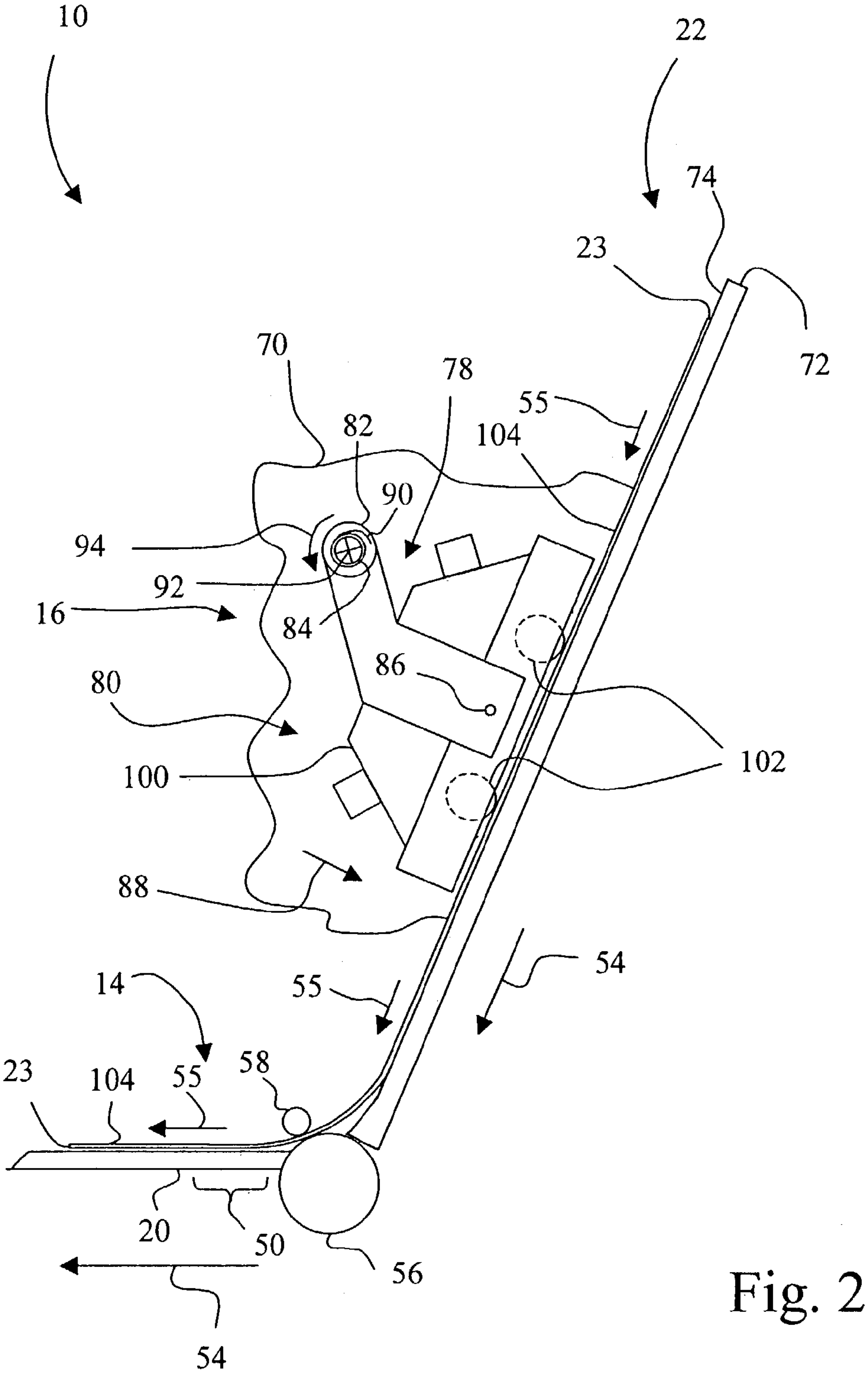
FIG. 2 is a side diagrammatic representation of a portion of the imaging apparatus depicted in FIG. 1.

Referring now to the drawings, and particularly to FIGS. 1 and 2, there is shown an imaging system 6 embodying the present invention. Imaging system 6 includes a computer 8 and an imaging device in the form of an ink jet printer 10. Computer 8 is communicatively coupled to ink jet printer 10 via a communications link 11. Communications link 11 may be, for example, a direct electrical or optical connection, or a network connection.

Computer 8 is typical of that known in the art, and includes a display, an input device, e.g., a keyboard, a processor, and associated memory. Resident in the memory of computer 8 is printer driver software. The printer driver software places print data and print commands in a format that can be recognized by ink jet printer 10. The format can be, for example, a data packet including print data and printing commands for a given area, such as a print swath, and including a print header that identifies the swath data.

Ink jet printer 10 includes a printhead carrier system 12, a feed roller unit 14, a media sensor assembly 16, a controller 18, a mid-frame 20 and a media source 22.

Media source 22, such as a paper tray, is configured and located to supply individual print media sheets 23 to feed roller unit 14, which in turn further transports the print media sheets 23 during a printing operation.

Printhead carrier system 12 includes a printhead carrier 24 for carrying a color printhead 26 and a black printhead 28. A color ink reservoir 30 is provided in fluid communication with color printhead 26, and a black ink reservoir 32 is provided in fluid communication with black printhead 28. Printhead carrier system 12 and printheads 26, 28 may be configured for unidirectional printing or bi-directional printing.

Printhead carrier 24 is guided by a pair of guide members 34. Each of guide members 34 may be, for example, a guide rod or a guide rail. The axes 36 of guide members 34 define a bi-directional scanning path 36 for printhead carrier 24. Printhead carrier 24 is connected to a carrier transport belt 38 that is driven by a carrier motor 40 via a carrier pulley 42. Carrier motor 40 has a rotating carrier motor shaft 44 that is attached to carrier pulley 42. At the directive of controller 18, printhead carrier 24 is transported in a reciprocating manner along guide members 34. Carrier motor 40 can be, for example, a direct current (DC) motor or a stepper motor.

The reciprocation of printhead carrier 24 transports ink jet printheads 26, 28 across the print media sheet 23, such as paper, along bi-directional scanning path 36 to define a two-dimensional, e.g., rectangular, print zone 50 of printer 10. This reciprocation occurs in a main scan direction 52. The print media sheet 23 is transported in a sheet feed direction 54. In the orientation of FIG. 1, the sheet feed direction 54 is shown as flowing down media source 22, and toward the reader (represented by an X) along mid-frame 20. Main scan direction 52, which is commonly referred to as the horizontal direction, is parallel with bi-directional scanning path 36 and is substantially perpendicular to sheet feed direction 54, which is commonly referred to as the vertical direction. During each scan of printhead carrier 24, the print media sheet 23 is held stationary by feed roller unit 14.

Referring also to FIG. 2, feed roller unit 14 includes a feed roller 56 and corresponding pinch rollers 58. Feed roller 56 is driven by a drive unit 60 (FIG. 1). Feed pinch rollers 58 apply a biasing force to hold the print media sheet 23 in contact with respective driven feed roller 56. Drive unit 60 includes a drive source, such as a stepper motor, and an associated drive mechanism, such as a gear train or belt/pulley arrangement. Feed roller unit 14 feeds the print media sheet 23 along a print media path 55 in a sheet feed direction 54 (see FIGS. 1 and 2).

Controller 18 is electrically connected to printheads 26 and 28 via a printhead interface cable 62. Controller 18 is electrically connected to carrier motor 40 via an interface cable 64. Controller 18 is electrically connected to drive unit 60 via an interface cable 66. Controller 18 is electrically connected to media sensor assembly 16 via an interface cable 68.

Controller 18 includes a microprocessor having an associated random access memory (RAM) and read only memory (ROM). Controller 18 executes program instructions to effect the printing of an image on the print media sheet 23, which can be one or more media types, such as coated paper, plain paper, photo paper and transparency. In addition, controller 18 executes instructions to conduct media sensing, such as detecting the presence or absence of the print media sheet 23, or the determination of media type, based on information received from media sensor assembly 16.

FIG. 2 includes a broken out section that is enlarged in relation to the other components of FIG. 2 to more clearly show the components of media sensor assembly 16. Media sensor assembly 16 is rotatably coupled to a frame 70 of ink jet printer 10. Also, media source 22 is attached, at least in part, to frame 70. Media source 22 includes a media support 72 including a media support surface 74. In the embodiment shown, media sensor assembly 16 is located upstream of print zone 50, and more particularly, adjacent to media source 22

Media sensor assembly 16 includes a mounting device 78 and a media sensor 80. Media sensor assembly 16 is coupled to frame 70 via mounting device 78. Mounting device 78 includes a pivot arm 82 that is pivotably attached to frame 70 via a pivot rod 84, and is pivotably attached to media sensor 80 via pivot pins 86. A spring 90 provides a biasing force to pivot media sensor assembly 16 about axis 92 in the direction indicated by arrow 94. In an alternative arrangement, sensor assembly 16 may be biased simply by the forces of gravity. Thus, mounting device 78 is configured to facilitate movement of media sensor 80 in a direction 88 toward print media path 55, and more particularly, toward media support 72, and to restrain movement of media sensor 80 in sheet feed direction 54.

Media sensor assembly 16 includes a body 100 and at least one rotating member 102, such as for example, one or more wheels. Media sensor 80 is positioned by mounting device 78 such that each rotating member 102 rotates due to contact with a surface 104 of print media sheet 23 as print media sheet 23 moves relative to media sensor 80 in sheet feed direction 54 along print media path 55.

Contained within body 100 are the electrical sensory components, such as for example, a light source, a specular detector and/or a diffuse detector, the configuration and operation of which is known in the art. In its simplest form, the light source may include, for example, a light emitting diode (LED). In a more complex form, the light source may further include additional optical components for generating a collimated light beam. Each of the specular detector and/or the diffuse detector can be, for example, a phototransistor.

Figure 3:
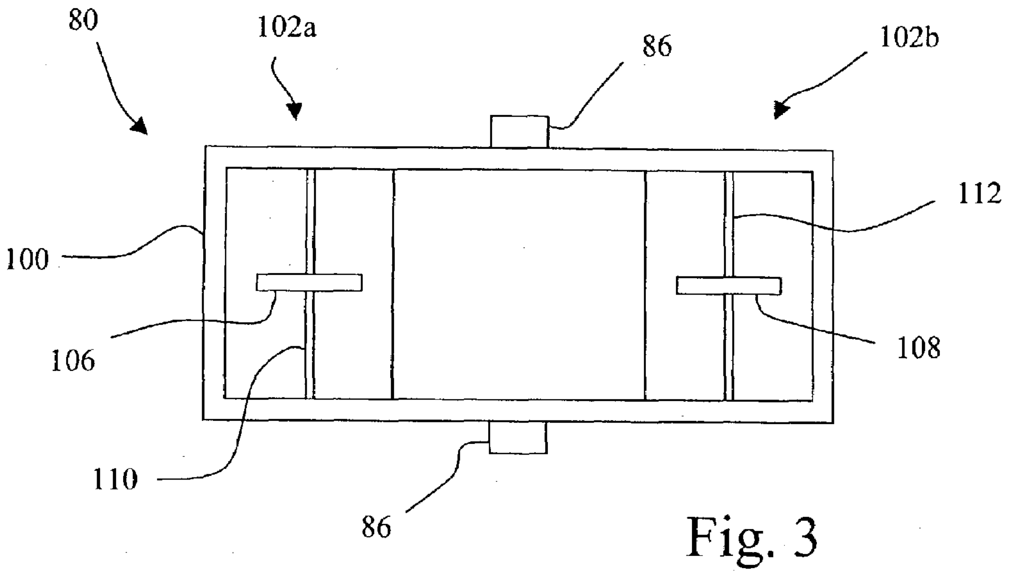
FIG. 3 is a bottom view of one embodiment of a media sensor used in the imaging apparatus of FIGS. 1 and 2.

FIG. 3 shows a bottom view of one embodiment of media sensor 80, which is adadpted to include a pair of rotating members 102, individually identified as rotating member 102*a* and 102*b*. Rotating members 102*a*, 102*b* include a wheel 106 and 108, respectively, rotatably coupled to body 100 via an axle 110 and 112, respectively. Wheels 106, 108 may be configured to rotate about their respective axles 110, 112. Alternatively, wheel 106 and axle 110 may form a unitary structure, and wheel 108 and axle 112 may form a unitary structure, with each of axles 110, 112 rotating within corresponding recesses formed in body 100.

Figure 4:
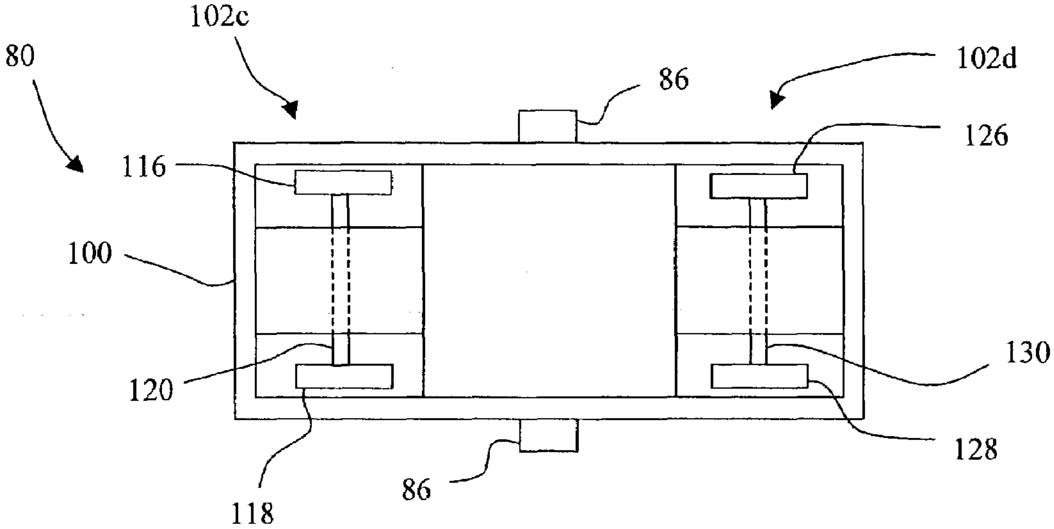
FIG. 4 is a bottom view of another embodiment of a media sensor used in the imaging apparatus of FIGS. 1 and 2.

FIG. 4 shows a bottom view of another embodiment of media sensor 80, which is adapted to include two rotating members 102, individually identified as rotating members 102*c* and 102*d*. Rotating member 102*c* includes coaxial wheels 116 and 118, rotatably coupled to body 100 via an axle 120. Rotating member 102*d* includes coaxial wheels 126 and 128, rotatably coupled to body 100 via an axle 130. Wheels 116, 118 may be configured to rotate about axle 120. Alternatively, wheels 116, 118 may be affixed to axle 120 to form a unitary structure, with axle 120 rotating within corresponding recesses formed in body 100. Likewise, wheels 126, 128 may be configured to rotate about axle 130. Alternatively, wheels 126, 128 may be affixed to axle 130 to form a unitary structure, with axle 130 rotating within corresponding recesses formed in body 100. As a further alternative, each of wheels, 116, 118, 126, 128 may be rotatably coupled to body 100, for example, by respective stub axles that extend outwardly from body 100.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An imaging apparatus having a print media path for transporting a print media sheet in a sheet feed direction, comprising:

a frame;

a mounting device coupled to said frame; and a media sensor having a body and a plurality of rotating members rotatably coupled to said body having two rotating members spaced apart in said sheet feed direction, said body being coupled to said mounting device, said mounting device being configured to facilitate movement of said media sensor in a direction toward said media path and to restrain movement of said media sensor in said sheet feed direction, said media sensor being positioned by said mounting device such that said plurality of rotating members rotate due to their contact with a surface of said print media sheet as said print media sheet moves relative to said media sensor in said sheet feed direction along said print media path.

2. The imaging apparatus of claim 1, wherein said plurality of rotating members includes two wheels spaced apart in said sheet feed direction.

3. The imaging apparatus of claim 1, wherein said plurality of rotating members includes two wheels spaced apart in said sheet feed direction and a pair of coaxial wheels.

4. The imaging apparatus of claim 1, wherein said media sensor is located upstream of a print zone of said imaging apparatus.

5. The imaging apparatus of claim 1, further comprising a media source, wherein said media sensor is located adjacent to said media source.

6. The imaging apparatus of claim 1, wherein said imaging apparatus is an ink jet printer.

7. An imaging apparatus, comprising:

a frame;

a print media source coupled to said frame, said print media source including a media support defining, in part, a print media path along which a print media sheet is transported in a sheet feed direction;

a mounting device coupled to said frame; and a media sensor having a body and a plurality of rotating members rotatably coupled to said body having two rotating members spaced apart in said sheet feed direction, said body being coupled to said mounting device, said mounting device being configured to facilitate movement of said media sensor in a direction toward said media support and to restrain movement of said media sensor in said sheet feed direction, said media sensor being positioned by said mounting device such that said plurality of rotating members rotate due to their contact with a surface of said print media sheet as said print media sheet moves relative to said media sensor in said sheet feed direction.

8. The imaging apparatus of claim 7, wherein said plurality of rotating members includes two wheels spaced apart in said sheet feed direction.

9. The imaging apparatus of claim 7, wherein said plurality of rotating members includes two wheels spaced apart in said sheet feed direction and a pair of coaxial wheels.

10. The imaging apparatus of claim 7, wherein said media sensor is located upstream of a print zone of said imaging apparatus.

11. The imaging apparatus of claim 7, wherein said imaging apparatus is an ink jet printer.

12. The imaging apparatus of claim 1, wherein said mounting device includes a pivot arm pivotably attached to said frame, and said pivot arm being pivotably attached to said body of said media sensor at a location between said two rotating members in said sheet feed direction.

13. The imaging apparatus of claim 7, wherein said mounting device includes a pivot arm pivotably attached to said frame, and said pivot arm being pivotably attached to said body of said media sensor at a location between said two rotating members in said sheet feed direction.

* * * * *